US012578680B2

(12) United States Patent
Yoon et al.

(10) Patent No.: US 12,578,680 B2
(45) Date of Patent: Mar. 17, 2026

(54) APPARATUS AND METHOD FOR REPRODUCING HOLOGRAM IMAGE

(71) Applicant: ELECTRONICS AND TELECOMMUNICATIONS RESEARCH INSTITUTE, Daejeon (KR)

(72) Inventors: Min-Sung Yoon, Daejeon (KR); Hyoung Lee, Daejeon (KR); Ki-Bong Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 346 days.

(21) Appl. No.: 18/102,867

(22) Filed: Jan. 30, 2023

(65) Prior Publication Data

US 2024/0036517 A1 Feb. 1, 2024

(30) Foreign Application Priority Data

Jul. 29, 2022 (KR) ........................ 10-2022-0094503

(51) Int. Cl.
| | |
|---|---|
| *G03H 1/08* | (2006.01) |
| *G02B 3/06* | (2006.01) |
| *G02B 27/10* | (2006.01) |
| *G02B 27/30* | (2006.01) |
| *G02B 30/40* | (2020.01) |
| *G02B 30/50* | (2020.01) |
| *G06T 7/194* | (2017.01) |
| *G02B 3/00* | (2006.01) |
| *G03H 1/22* | (2006.01) |

(52) U.S. Cl.
CPC ............. *G03H 1/0891* (2013.01); *G02B 3/06* (2013.01); *G02B 27/1026* (2013.01); *G02B 27/30* (2013.01); *G02B 30/40* (2020.01); *G02B 30/50* (2020.01); *G06T 7/194* (2017.01); *G02B 2003/0093* (2013.01); *G03H 2001/2281* (2013.01)

(58) Field of Classification Search
CPC ......... G03H 1/0891; G03H 2001/2281; G03H 2001/32; G06T 7/194; G02B 30/40; G02B 30/50
See application file for complete search history.

(56) References Cited

U.S. PATENT DOCUMENTS

| | | | | |
|---|---|---|---|---|
| 5,977,938 A | * | 11/1999 | Iwasa | .................... G06F 3/0423 345/32 |
| 6,412,949 B1 | * | 7/2002 | Halldorsson | ........... G02B 30/25 359/464 |

(Continued)

FOREIGN PATENT DOCUMENTS

| | | |
|---|---|---|
| JP | 2020-515090 A | 5/2020 |
| KR | 10-2001-0053563 A | 6/2001 |

(Continued)

*Primary Examiner* — Kathleen V Nguyen
(74) *Attorney, Agent, or Firm* — NSIP Law

(57) ABSTRACT

Disclosed herein is an apparatus for reproducing a hologram image. The apparatus may include a holographic display module for reproducing a digital hologram, a background display module for reproducing a background image, and a combiner for selecting the background image in consideration of the depth map of the digital hologram and reproducing a hologram image synthesized by combining the selected background image with the digital hologram.

17 Claims, 11 Drawing Sheets

(56)                    References Cited

U.S. PATENT DOCUMENTS

| | | | |
|---|---|---|---|
| 8,408,775 B1 * | 4/2013 | Coleman ........... | G02F 1/133526 |
| | | | 362/616 |
| 11,532,122 B2 | 12/2022 | Yoon et al. | |
| 2010/0195022 A1 * | 8/2010 | Shikii .................. | G02B 6/0028 |
| | | | 362/626 |
| 2013/0155476 A1 * | 6/2013 | Lee ...................... | G03H 1/2294 |
| | | | 359/9 |
| 2014/0347726 A1 | 11/2014 | Yang et al. | |
| 2018/0252934 A1 * | 9/2018 | Kim ........................ | G02B 30/36 |
| 2019/0138094 A1 | 5/2019 | Miettinen et al. | |
| 2021/0208397 A1 | 7/2021 | Lu et al. | |
| 2022/0179359 A1 | 6/2022 | Pi et al. | |
| 2022/0214646 A1 | 7/2022 | Hong | |
| 2023/0205133 A1 * | 6/2023 | Matusik ................... | G03H 1/04 |
| | | | 359/9 |

FOREIGN PATENT DOCUMENTS

| | | | |
|---|---|---|---|
| KR | 10-2014-0136701 A | | 12/2014 |
| KR | 10-2017-0135379 A | | 12/2017 |
| KR | 2017/0135379 | * | 12/2017 |
| KR | 10-2019-0068802 A | | 6/2019 |
| KR | 20190060062 | * | 6/2019 |
| KR | 10-2021-0113053 A | | 9/2021 |

* cited by examiner

|  | "Cone" shape | "Cube" shape | "Sphere" shape | "Torus" shape |
|---|---|---|---|---|
| Green Image (Maya S/W) | | | | |
| Depth map Image | | | | |
| CGH (Maya S/W) | | | | |

FIG. 4

| | Focus Front Object | Focus Rear Object | Focus SLM Object |
|---|---|---|---|
| "Torus" Object | | | |
| "Cube" Object | | | |
| "Cobe" Object | | | |
| "Cone" Object | | | |

FOCAL AREA

REPRODUCE DIGITAL HOLOGRAM ~S110

REPRODUCE BACKGROUND IMAGE ~S200

SELECT BACKGROUND IMAGE AND REPRODUCE HOLOGRAM IMAGE BY COMBINING SELECTED BACKGROUND IMAGE WITH DIGITAL HOLOGRAM ~S300

DISPLAY REPRODUCED HOLOGRAM IMAGE ~S400

APPARATUS AND METHOD FOR REPRODUCING HOLOGRAM IMAGE

CROSS REFERENCE TO RELATED APPLICATION

This application claims the benefit of Korean Patent Application No. 10-2022-0094503, filed Jul. 29, 2022, which is hereby incorporated by reference in its entirety into this application.

BACKGROUND OF THE INVENTION

1. Technical Field

The present disclosure relates to an apparatus and method for reproducing a hologram image for hyperreality.

2. Description of the Related Art

Metaverse technology, which has recently attracted a lot of attention, includes Hologram (HR), Virtual Reality (VR), Augmented Reality (AR), Mixed Reality (MR), and eXtended Reality (XR) including all of these technologies. Such extended-reality technology aims to provide top-quality 3D image content such that users are able to experience both a virtual world and a real world.

Digital hologram display technology is display technology capable of displaying a stereoscopic image so as to look natural and to be comfortable to eyes of users, and is technology that reproduces a wavefront generated from a given object without change, thereby giving the same effect as if the corresponding object really existed when a user views the reproduced wavefront.

With regard to conventional digital hologram display technology, research for improving the quality of a digital hologram is continuously conducted in order to maximize a sense of immersion and clearness, but problems such as a long generation time of a Computer-Generated Hologram (CGH), a content size, background processing, noise, and the like cause quality degradation.

SUMMARY OF THE INVENTION

An object of the present disclosure is to provide a hologram image reproduction apparatus and method in order to reproduce a hologram for maximizing clearness and a sense of immersion.

In order to accomplish the above object, an apparatus for reproducing a hologram image according to the present disclosure may include a holographic display module for reproducing a digital hologram, a background display module for reproducing a background image, and a combiner for selecting the background image in consideration of the depth map of the digital hologram and reproducing a hologram image synthesized by combining the selected background image with the digital hologram.

The apparatus may further include an image view guide module for displaying the reproduced hologram image.

The holographic display module and the background display module may be disposed on different optical paths based on the combiner.

The background display module may include a convex lens disposed between a background display and the combiner.

The background display may move forwards and backwards along an optical path, and the depth of the background image may be adjusted depending on the location of the background display.

The size of the background image may be adjusted depending on the location of the convex lens moving along a path between the background display and the combiner.

Image content of the digital hologram may be acquired using a neural network.

The holographic display module may include a light source generator along with a collimator, a spatial light modulator, and a field lens disposed on a path of a light source generated from the light source generator.

The background image may be a 2D or 3D image.

The holographic display module may adjust the depth of an object image in a process of combining the digital hologram with the background image.

Also, a method for reproducing a hologram image according to the present disclosure may include reproducing, by a holographic display module, a digital hologram; reproducing, by a background display module, a background image; and selecting, by a combiner, the background image in consideration of the depth map of the digital hologram and reproducing, by the combiner, a hologram image synthesized by combining the selected background image with the digital hologram.

The holographic display module and the background display module may be disposed on different optical paths based on the combiner.

The background display module may include a convex lens disposed between a background display and the combiner.

The background display may move forwards and backwards along an optical path, and the depth of the background image may be adjusted depending on the location of the background display.

The size of the background image may be adjusted depending on the location of the convex lens moving along a path between the background display and the combiner.

Image content of the digital hologram may be acquired using a neural network.

The holographic display module may include a light source generator for generating a light source and a collimator for removing speckles, noise, and moiré of the light source.

The background image may be a 2D image or a 3D image.

The holographic display module may adjust the depth of an object image in a process of combining the digital hologram with the background image.

BRIEF DESCRIPTION OF THE DRAWINGS

The above and other objects, features, and advantages of the present disclosure will be more clearly understood from the following detailed description taken in conjunction with the accompanying drawings, in which:

FIG. 4 is a view illustrating an example of a result of reproduction of a digital hologram according to an embodiment;

DESCRIPTION OF THE PREFERRED EMBODIMENTS

Figure 1:
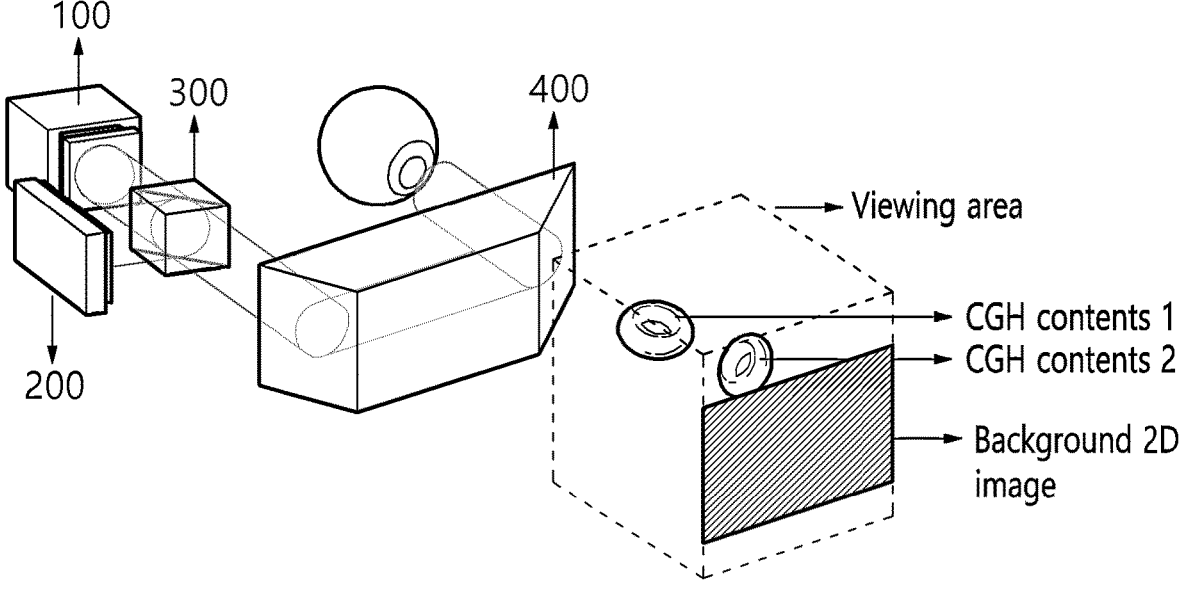
FIG. 1 is a view illustrating a concept diagram of an apparatus for reproducing a hologram image according to an embodiment.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a view illustrating a concept diagram of an apparatus for reproducing a hologram image according to an embodiment.

Referring to FIG. 1, the apparatus for reproducing a hologram image according to an embodiment may include a holographic display module 100, a background display module 200, a combiner 300, and an image view guide module 400.

The holographic display module 100 may reproduce a digital hologram (a Computer-Generated Hologram (CGH)). The background display module 200 may reproduce a 2D background image or a 3D background image. The combiner 300 may reproduce a hologram image in which the digital hologram and the background image are combined. Here, the hologram image may indicate an image in which the digital hologram and the background image are combined.

The digital hologram and the background image may have different depth maps, and the combiner 300 may select a background image, the depth map of which differs from the depth map of the digital hologram, in consideration of the depth map of the digital hologram, and may combine the selected background image with the digital hologram.

The holographic display module 100 and the background display module 200 may be disposed on different optical paths based on the combiner 300, but the locations thereof are not limited.

The holographic display module 100 may adjust the depth of an object image for the digital hologram in the process of combining the digital hologram with the background image.

The image view guide module 400 may display the hologram image. The image view guide module 400 may be disposed in front of the combiner 300, e.g., in the direction in which the hologram image is oriented.

For example, a hologram image displayed through the image view guide module 400 includes first hologram image content (CGH content 1) and second hologram image content (CGH content 2), having multiple viewpoints, and a background 2D image, the depth value of which is a preset ratio of the depth value of the hologram image content, may be displayed.

The apparatus for reproducing a hologram image according to an embodiment enables a difference in a sense of depth between the digital hologram content and the background 2D image to be easily perceived, thereby enabling the digital hologram content to be clearly viewed.

Figure 2:
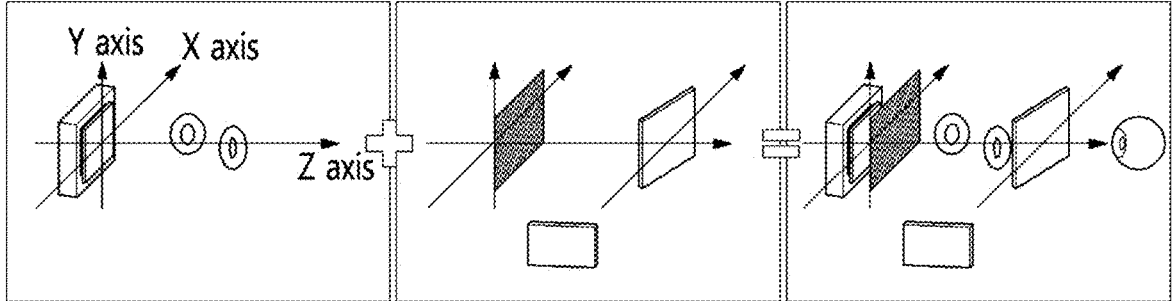
FIG. 2 is a view for explaining a process for reproducing a hologram image by an apparatus for reproducing a hologram image according to an embodiment.

FIG. 2 is a view for explaining a process for reproducing a hologram image by an apparatus for reproducing a hologram image according to an embodiment.

As illustrated left in FIG. 2, the holographic display module 100 may emit a digital hologram in a z-axis direction. As illustrated center right in FIG. 2, the background display module 200 emits light in the z-axis direction, and a background image may be displayed in the z-axis direction through the combiner 300. As illustrated in FIG. 2, the digital hologram reproduced by the holographic display module 100 is combined with the background image reproduced through the background display module 200, and may then enter the eyes of a user.

Figure 3:
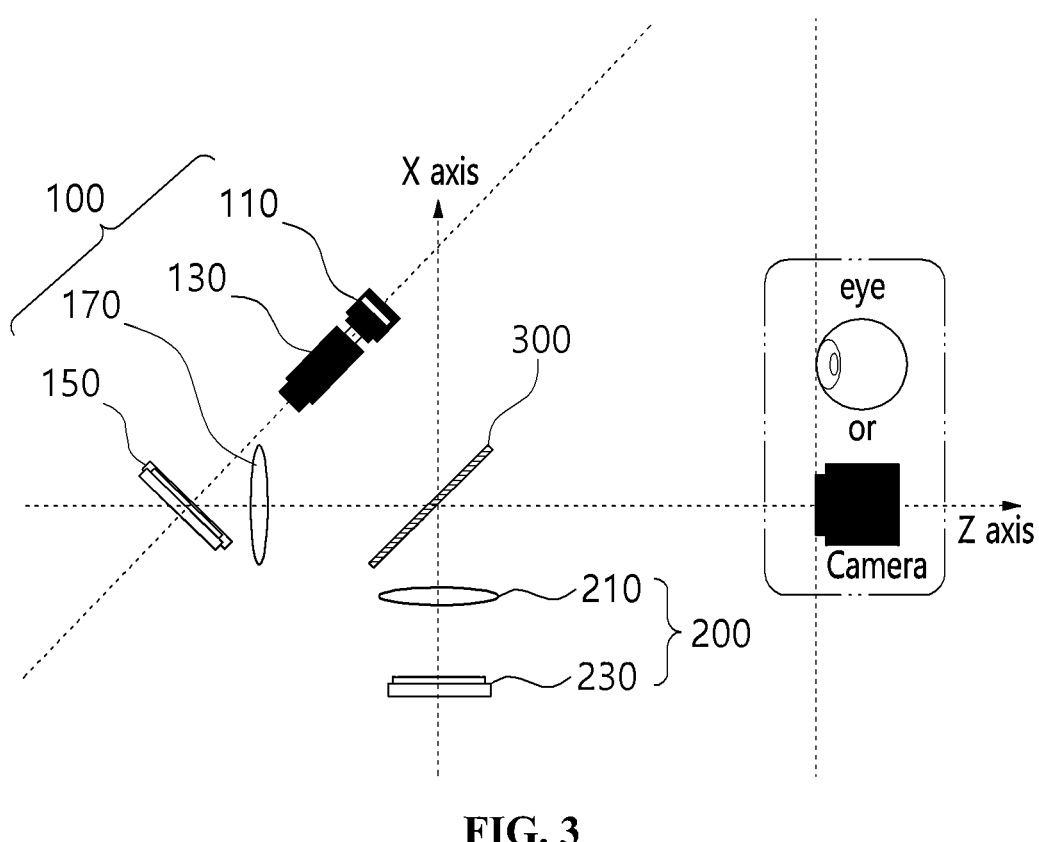
FIG. 3 is a view illustrating the configuration of an apparatus for reproducing a hologram image according to an embodiment.

FIG. 3 is a view illustrating the configuration of an apparatus for reproducing a hologram image according to an embodiment.

As illustrated in FIG. 3, the holographic display module 100 may include a laser light source 110, a collimator 130, a Spatial Light Modulator (SLM), and a field lens 170, which are sequentially arranged on an optical path.

In the case of laser of the laser light source 100, color lasers of R (633 nm), G (532 nm), and B (488 nm) may use the maximum intensity of 210(R) mA, 2500(G) mA, and 135(B) mA, respectively.

The collimator 130 may remove the speckle effect of laser light emitted from the laser light source and form uniform parallel beams. The formed parallel beams may arrive at the surface of the SLM 150.

The SLM 150 has the resolution of 3840×2160 pixels, a pixel size of 3.6 µm, and a frame rate of 120 Hz, and may operate with the performance of optical power stability equal to or less than 5%.

The beam reflected from the SLM 150 passes through the field lens 170, and the reconstructed and reproduced digital hologram may be observed at the focused position through an observation device, such as a CCD.

The field lens 170 has optical transparency, and may deliver light to the location corresponding to the eyes of a viewer.

The background display module 200 may include a convex lens 210 and a background display 230.

The background display 230 may be disposed on an optical path different from the optical path of the SLM 150 of the holographic display module 100 based on the combiner 300. The background image projected from the background display 230 may be delivered in the z-axis direction through the combiner 300. Here, the image delivered in the z-axis direction may be observed by a camera.

The background display 230 may use an OLED panel. The OLED panel has a size of 0.43 inches and the resolution of 1280×720, and may operate with the performance of a diagonal viewing angle of 23 degrees. The background display 230 may move forwards or backwards at fixed intervals along the optical axis. The depth control for the background image may be performed depending on the location to which the background display 230 moves.

The convex lens 210 may be disposed between the background display 230 and the combiner 300. The convex lens 210 may be disposed by moving between the background display 230 and the combiner 300. The image size of the background image may be adjusted depending on the location to which the convex lens 210 moves.

The combiner 300 may include a semi-transparent mirror. The semi-transparent mirror may change the paths of the digital hologram and background image.

The above-described configuration of the apparatus for reproducing a hologram image is an example for an experiment, and the configuration and specification thereof are not limited thereto.

Figure 5:
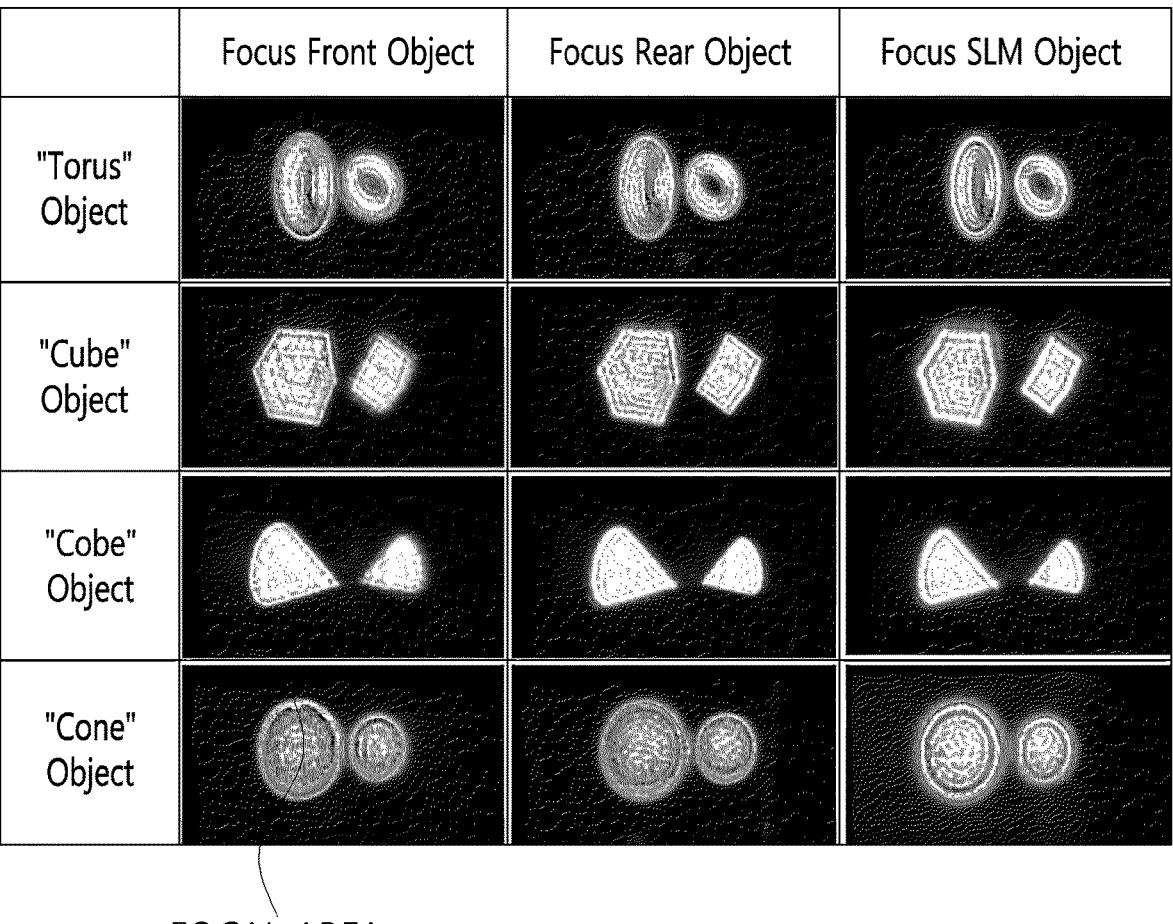
FIG. 5 is an example illustrating various results when multifocal representation in a 3D reconstruction image of a digital hologram is observed by a camera according to an embodiment.
Figure 6:
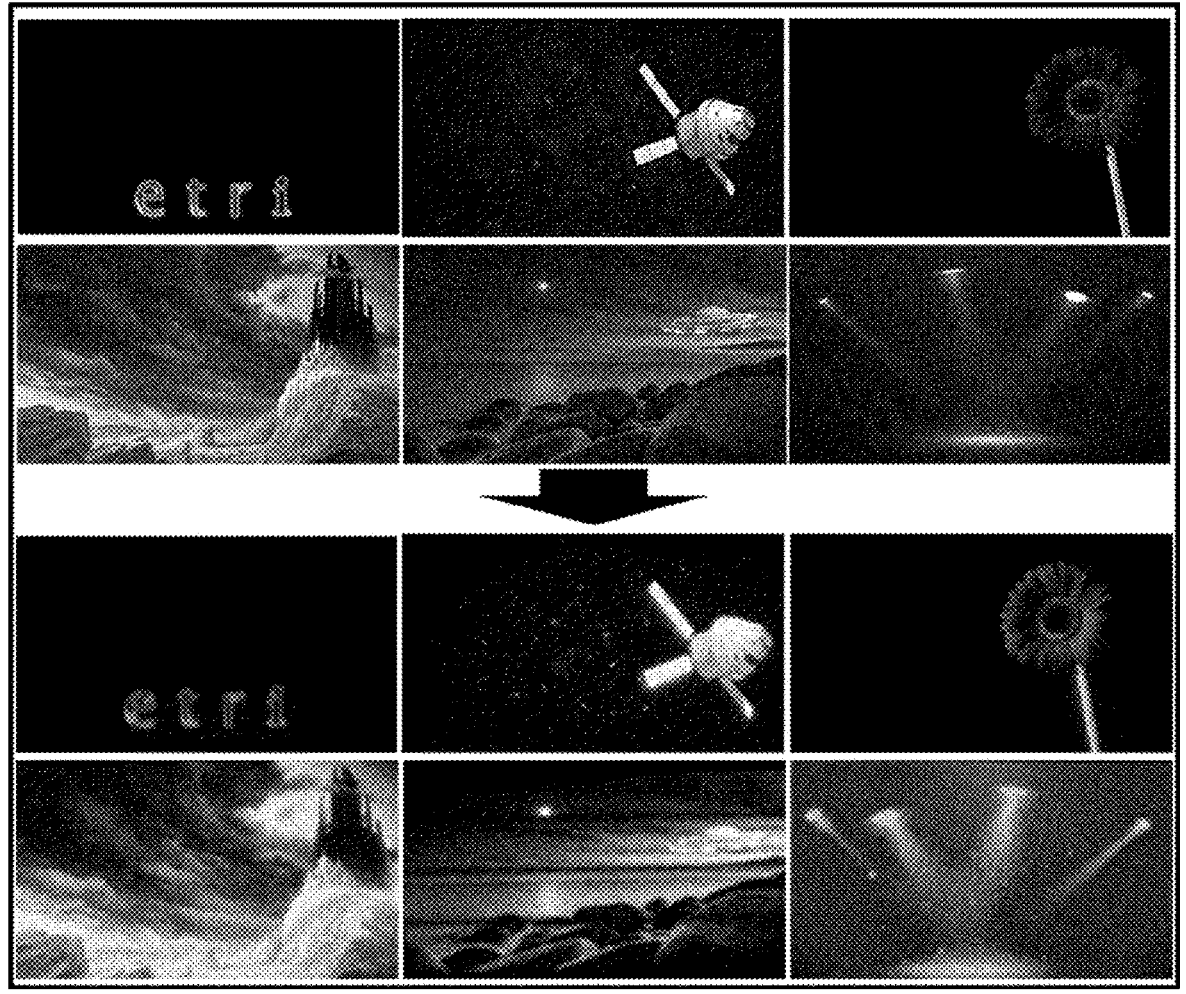
FIG. 6 is an example illustrating various results when a background image is observed by a camera according to an embodiment.
Figure 7:
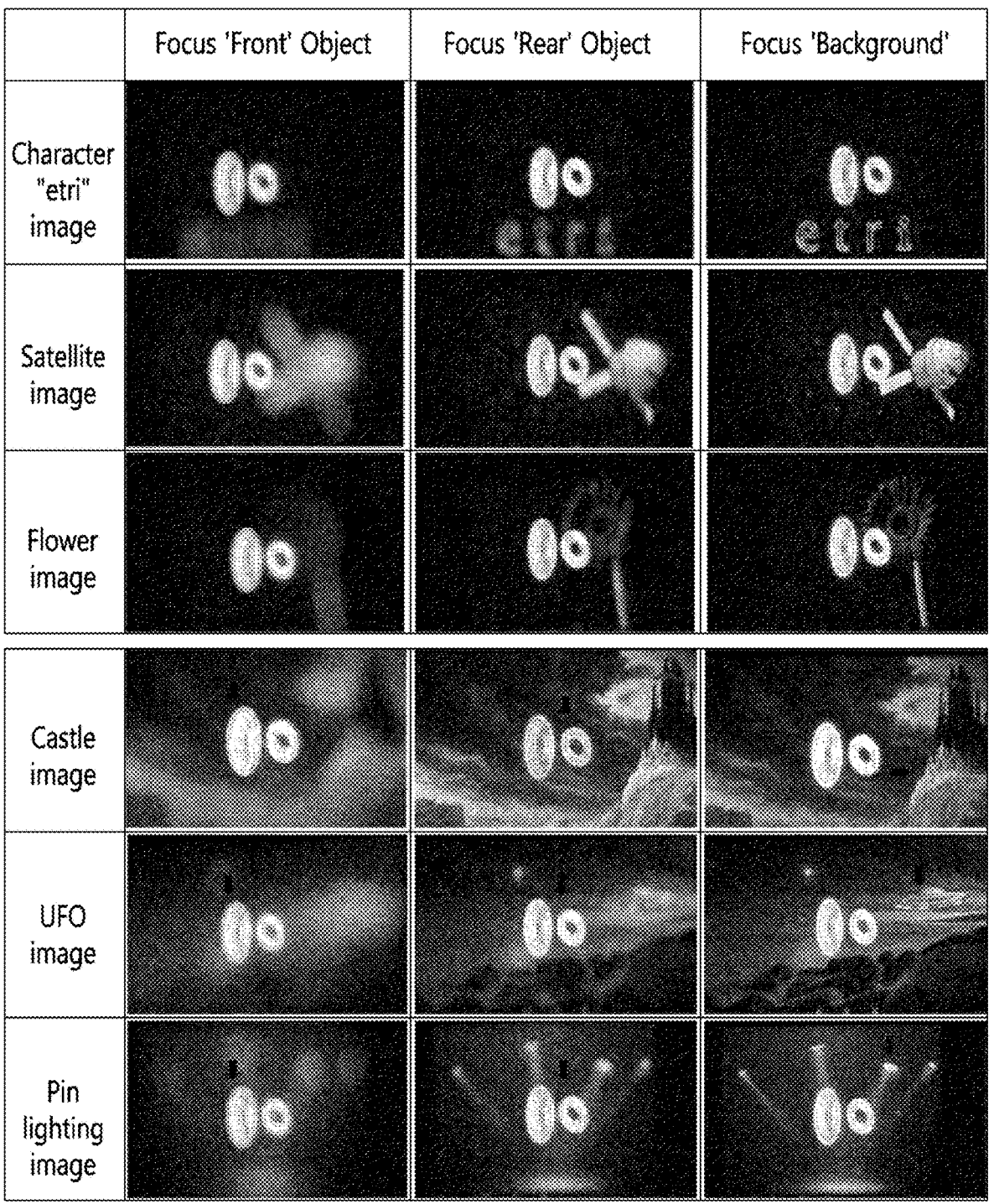
FIG. 7 is an example illustrating various results of observing, by a camera, an image reconstructed in a 3D space after hologram data is input to a display according to an embodiment.

FIG. 4 is a view illustrating an example of a result of reproduction of a digital hologram according to an embodiment, FIG. 5 is an example illustrating various results when multifocal representation in a 3D reconstruction image of a digital hologram is observed by a camera according to an embodiment, FIG. 6 is an example illustrating various results when a background image is observed by a camera according to an embodiment, and FIG. 7 is an example illustrating various results of observing, by a camera, an image reconstructed in a 3D space after hologram data is input to a display according to an embodiment.

A digital hologram may include a dataset configured with pairs comprising 360-degree, multi-view RGB images and depth map images, which are acquired through a real-image-based camera or a CG-based camera. As an example of a CG-based method, two identical 3D objects located near the origin are arranged, and a virtual camera having a light source for capturing the two solid objects is designed in order to extract a pair of an RGB image and a depth map in Maya software, whereby the virtual camera may acquire depth map information between the two objects.

Depth measurement in the Z-direction of the camera is performed using a preset luminance depth provided by Maya software. Then, it is calculated using a Fast Fourier Transform (FFT) algorithm based on RGB and depth map, whereby 1,024 consecutive digital hologram images may be finally reproduced.

A color image in content from a given point of a view, a depth image, and a digital hologram (CGH) synthesized using the color image and the depth image are as shown in FIG. 4. Only the digital holographic 3D reconstruction image observed by a camera is as shown in FIG. 5. Also, only the background image observed by the camera is as shown in FIG. 6. Also, when a hyper-realistic hologram reconstruction image in which the background image and the holographic 3D image are combined is observed by a camera, it is as shown in FIG. 7.

Meanwhile, in the embodiment, image content of a digital hologram may be acquired using a neural network, among models using a deep-learning scheme, whereby fast processing may be realized.

A deep-learning model may be configured with a structure including an encoder for extracting a feature map while reducing an input image data size and a decoder for expanding the reduced size of features.

In the encoding process, a downsampling process is performed on input image data using a widely known 'Pre-trained DenseNet-161' model, whereby a feature map may be extracted. Subsequently, in the decoding process, the reduced size of the feature map may be gradually scaled up using an up-sampling layer.

Finally, at an output layer, a single depth map image estimated to have the same size as the image of the input RGB data may be output through a bilinear interpolation process.

In the deep-learning model, a total of 4096 data pairs (the number of sets of color images and depth map images) is given. Among the data pairs, 60% thereof is used as a dataset for training the model and 40% thereof is used as a test dataset for measuring the performance of the trained model, regardless of the types of figures.

In order to find an optimal ratio α, a ratio corresponding to the condition under which the measured average Peak Signal-to-Noise Ratio (PSNR) value between a digital hologram depth map and a background image depth map of the models trained using the test dataset for each ratio is highest is set as a.

Figure 8:
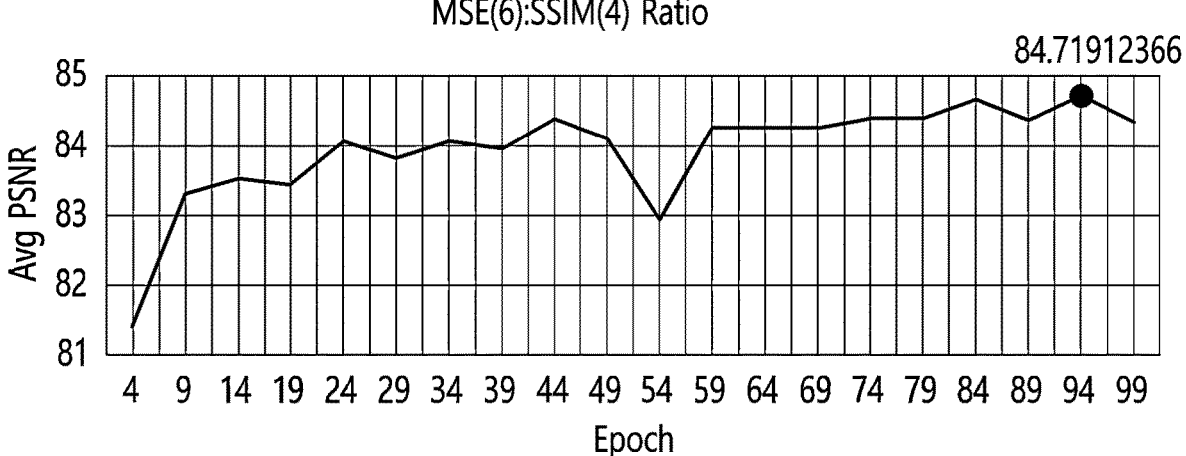
FIG. 8 is a graph illustrating a change in an average PSNR value for each epoch.

FIG. 8 is a graph illustrating a change in an average PSNR value for each epoch.

As illustrated in FIG. 8, the highest average PSNR is measured when a Mean Square Error (MSE) and a Structural Similarity Index Map (SSIM), which are indices for measuring image quality, have percentages of 60% and 40%, respectively, and in this case, the value of a may be 0.6.

Figure 9:
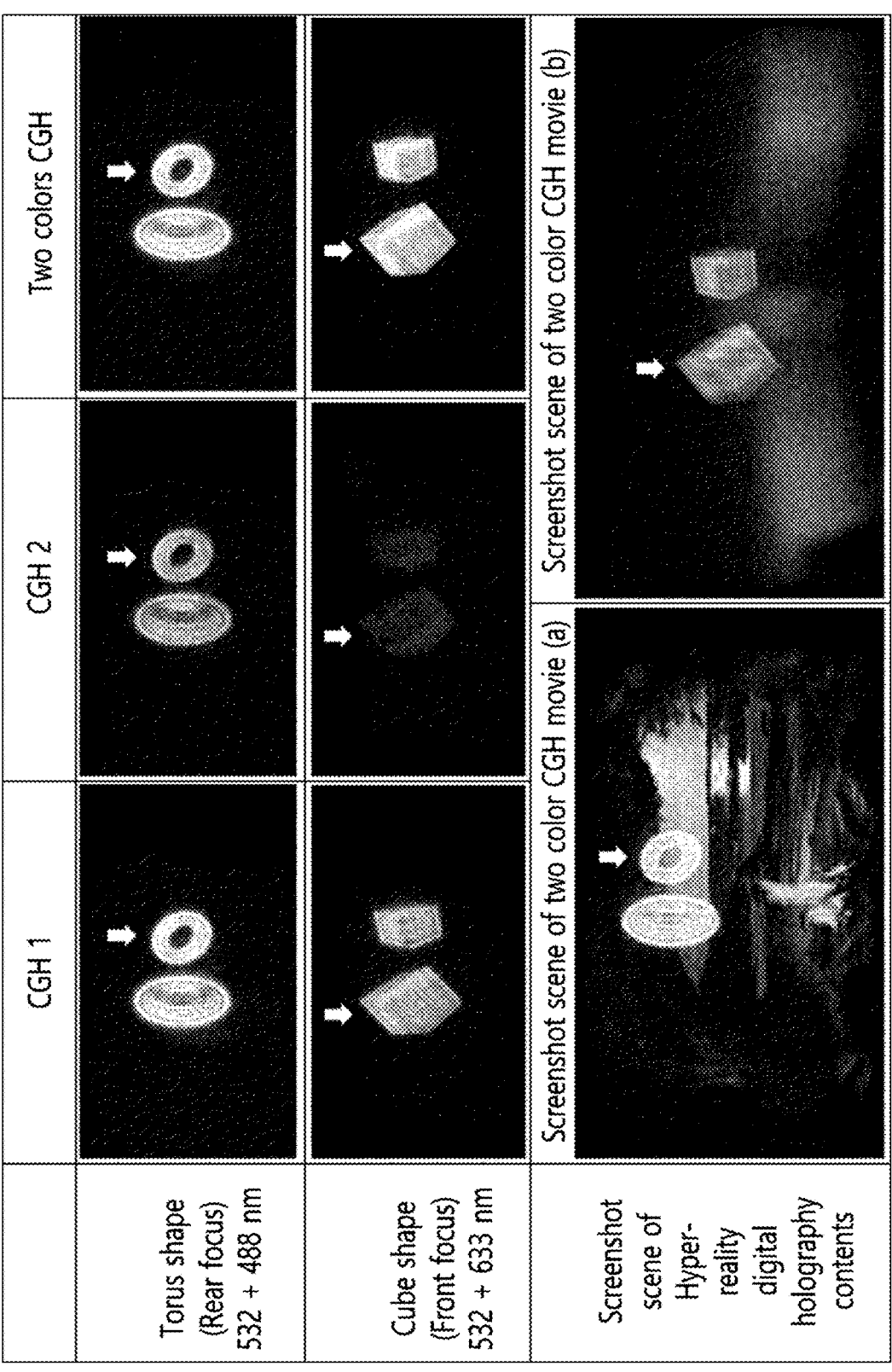
FIG. 9 is a view illustrating a result of reconstructing digital hologram content and viewing the same.

FIG. 9 is a view illustrating a result of reconstructing digital hologram content and viewing the same.

FIG. 9 illustrates an experiment and observation result of optical reconstruction of a holographic 3D scene in a 3D space after digital hologram data (CGH), which is synthesized through an FFT algorithm using a given color image and a depth map for digital hologram synthesis, which is estimated based on a deep-learning model, is uploaded to the proposed apparatus for reproducing a hologram image.

FIG. 9 shows a reconstructed image of a digital hologram, which is synthesized by applying a deep-learning model, and it can be seen that the image is reconstructed to be similar to the result of a digital hologram synthesized using the depth map of the original image.

Figure 10:
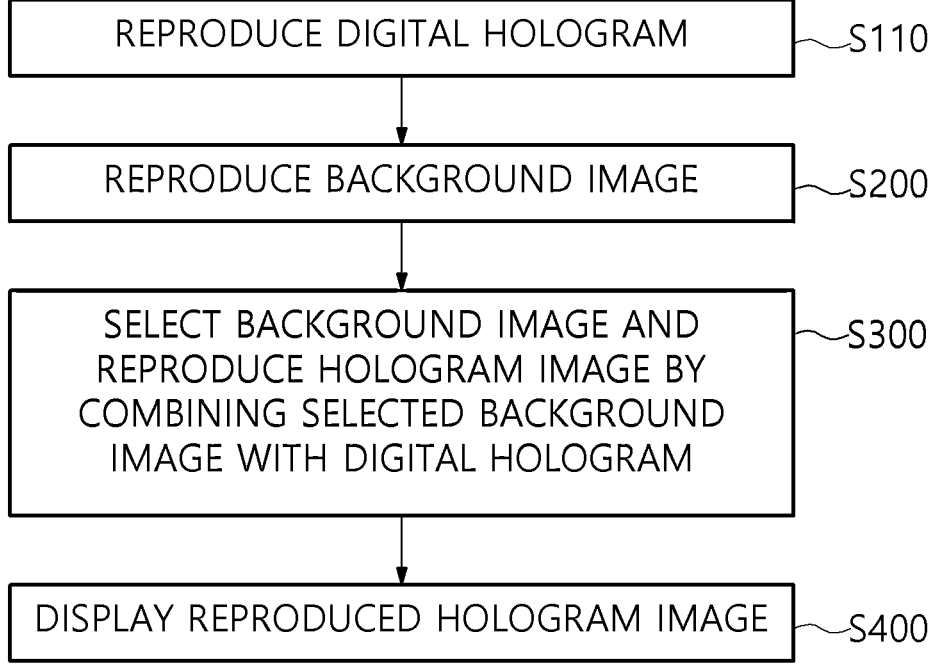
FIG. 10 is a flowchart illustrating a method for reproducing a hologram image according to an embodiment.

FIG. 10 is a flowchart illustrating a method for reproducing a hologram image according to an embodiment.

The method for reproducing a hologram image according to an embodiment may be performed by an apparatus for reproducing a hologram image.

As illustrated in FIG. 10, the apparatus for reproducing a hologram image may reproduce a digital hologram at step S110. The apparatus for reproducing a hologram image may reproduce a background image at step S120. The background image may be a 2D image or a 3D image.

The apparatus for reproducing a hologram image may reproduce a hologram image synthesized by combining the background image with the digital hologram at step S300.

First, the apparatus for reproducing a hologram image may select the background image in consideration of the depth map of the digital hologram. The apparatus for reproducing a hologram image may reproduce the hologram image by combining the selected background image with the digital hologram. The apparatus for reproducing a hologram image may display the synthesized hologram image.

Here, the apparatus for reproducing a hologram image may freely adjust the depth of an object image at the step of combining the digital hologram with the background image.

The apparatus for reproducing a hologram image according to an embodiment may be implemented in a computer system including a computer-readable recording medium.

Figure 11:
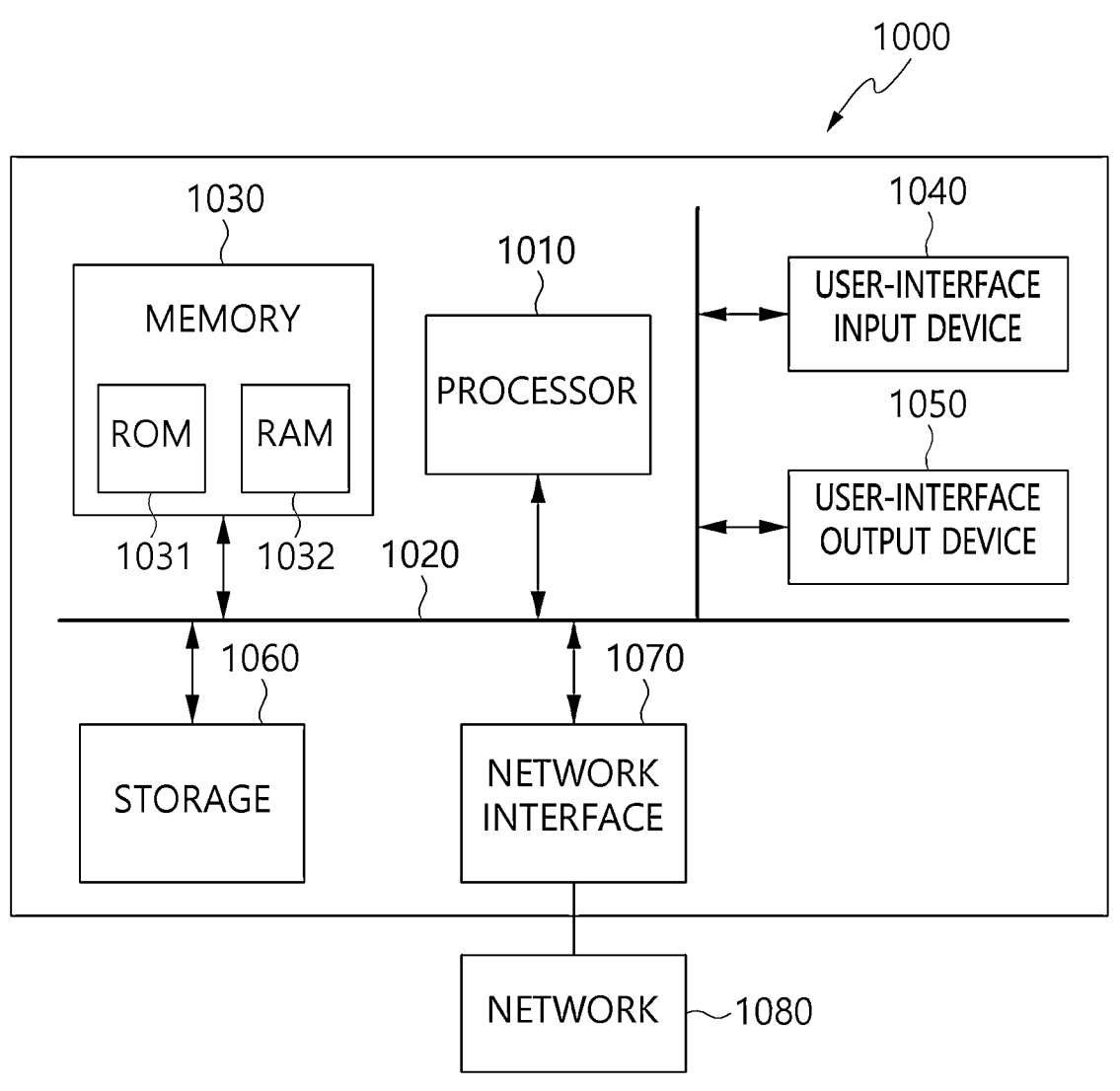
FIG. 11 is a block diagram illustrating the configuration of a computer system according to an embodiment.

FIG. 11 is a block diagram illustrating the configuration of a computer system according to an embodiment.

Referring to FIG. 11, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus for reproducing a hologram image.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for reproducing a hologram image according to an embodiment. Specifically, the memory may store multiple applications running in the apparatus for reproducing a hologram image and data and instructions for operation of the apparatus for reproducing a hologram image.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program therein may contain instructions for making a processor perform a method for controlling an operation for reproducing a digital hologram, an operation for reproducing a background image, and an operation for selecting the background image in consideration of the depth map of the digital hologram and reproducing a hologram image synthesized by combining the selected background image with the digital hologram.

According to an embodiment, a computer program stored in the computer-readable recording medium may include instructions for making a processor perform a method for controlling an operation for reproducing a digital hologram, an operation for reproducing a background image, and an operation for selecting the background image in consideration of the depth map of the digital hologram and reproducing a hologram image synthesized by combining the selected background image with the digital hologram.

According to the present disclosure, a digital hologram and a background image reproduced at different depths are combined, whereby hologram content may be clearly viewed and realistic background content for Augmented Reality (AR) projected in the 3D space may be viewed without crosstalk.

Also, the depth of a real holographic object image of the present disclosure may be freely adjusted in a hologram synthesis step. Also, the depth of a background image may be controlled by moving the location of a background display at fixed intervals along an optical axis, and the size of the background image may be freely set by adjusting the location of a convex lens.

Also, the present disclosure enables high-speed processing by estimating a depth map using a deep-learning method.

Also, the present disclosure enables eye focus and a depth to be adjusted, thereby minimizing eye strain when viewing content.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. An apparatus for reproducing a hologram image, comprising:

a holographic display module configured to reproduce a digital hologram;

a background display module, including a background display, and configured to reproduce a background image; and a combiner configured to select the background image based on a depth map of the digital hologram and reproduce a hologram image that is synthesized by combining the selected background image with the digital hologram, wherein the background display is configured to move forwards and backwards along an optical path, and a depth of the background image is adjusted based on a location of the background display, wherein, when a display plane of the holographic display module corresponds to an XY-plane, the holographic display module is configured to emit a digital hologram in a z-axis direction, wherein the background display module is configured to emit light in the z-axis direction, and wherein a background image is displayed in the z-axis direction through the combiner.

2. The apparatus of claim 1, further comprising:

an image view guide module configured to display the reproduced hologram image.

3. The apparatus of claim 1, wherein the holographic display module and the background display module are disposed on different optical paths based on the combiner.

4. The apparatus of claim 1, wherein image content of the digital hologram is acquired using a neural network.

5. The apparatus of claim 1, wherein the holographic display module includes a light source generator along with a collimator, a spatial light modulator, and a field lens disposed on a path of a light source generated from the light source generator.

6. The apparatus of claim 1, wherein the background image is a 2D or 3D image.

7. The apparatus of claim 1, wherein the holographic display module adjusts a depth of an object image in a process of combining the digital hologram with the background image.

8. The apparatus of claim 1, wherein the background display module includes a convex lens disposed between the background display and the combiner.

9. The apparatus of claim 8, wherein a size of the background image is adjusted depending on a location of the convex lens moving along a path between the background display and the combiner.

10. A method for reproducing a hologram image, comprising:

reproducing, by a holographic display module, a digital hologram;

reproducing, by a background display module which includes a background display, a background image; and selecting, by a combiner, the background image based on a depth map of the digital hologram and reproducing, by the combiner, a hologram image that is synthesized by combining the selected background image with the digital hologram, wherein the background display is configured to move forwards and backwards along an optical path, and a depth of the background image is adjusted based on a location of the background display, wherein, when a display plane of the holographic display module corresponds to an XY-plane, the holographic display module is configured to emit a digital hologram in a z-axis direction, wherein the background display module is configured to emit light in the z-axis direction, and wherein a background image is displayed in the z-axis direction through the combiner.

11. The method of claim 10, wherein the holographic display module and the background display module are disposed on different optical paths based on the combiner.

12. The method of claim 10, wherein image content of the digital hologram is acquired using a neural network.

13. The method of claim 10, wherein the holographic display module includes a light source generator configured to generate a light source and a collimator configured to remove speckles, noise, and moiré of the light source.

14. The method of claim 10, wherein the background image is a 2D or 3D image.

15. The method of claim 10, wherein the holographic display module adjusts a depth of an object image in a process of combining the digital hologram with the background image.

16. The method of claim 10, wherein the background display module includes a convex lens disposed between the background display and the combiner.

17. The method of claim 16, wherein a size of the background image is adjusted depending on a location of the convex lens moving along a path between the background display and the combiner.

* * * * *